United States Patent [19]

Brademeyer

[11] Patent Number: 4,553,471
[45] Date of Patent: Nov. 19, 1985

[54] WHEEL CYLINDER ASSEMBLY WITH PROPORTIONER

[75] Inventor: David L. Brademeyer, Centerville, Ohio

[73] Assignee: General Motors Corporation, Detroit, Mich.

[21] Appl. No.: 590,477

[22] Filed: Mar. 16, 1984

[51] Int. Cl.⁴ ............................ F15B 11/20; F01B 7/02
[52] U.S. Cl. ......................................... 91/173; 91/517; 60/591; 60/584; 92/75
[58] Field of Search ........................ 60/591, 561, 584; 92/75, 50, 69, 52, 66; 188/349, 348, 352; 303/6 C; 91/173, 514, 517, 532

[56] References Cited

U.S. PATENT DOCUMENTS

| | | | |
|---|---|---|---|
| 3,128,846 | 4/1964 | Stelzer | 188/349 |
| 3,773,362 | 11/1973 | Lewis | 188/349 |
| 3,796,290 | 3/1974 | Limberg | 188/352 |
| 3,973,473 | 8/1976 | Bate | 92/75 |
| 4,286,504 | 9/1981 | Carre et al. | 92/75 |
| 4,292,883 | 10/1981 | Riquort et al. | 188/349 |
| 4,456,104 | 6/1984 | Mortimer et al. | 303/6 C |
| 4,496,033 | 1/1985 | Hall et al. | 91/173 |

Primary Examiner—Robert E. Garrett
Assistant Examiner—Richard S. Meyer
Attorney, Agent, or Firm—D. D. McGraw

[57] ABSTRACT

A wheel cylinder assembly has telescoping brake actuating pistons with a brake pressure proportioner in the larger actuating piston to proportion brake actuating pressure.

3 Claims, 1 Drawing Figure

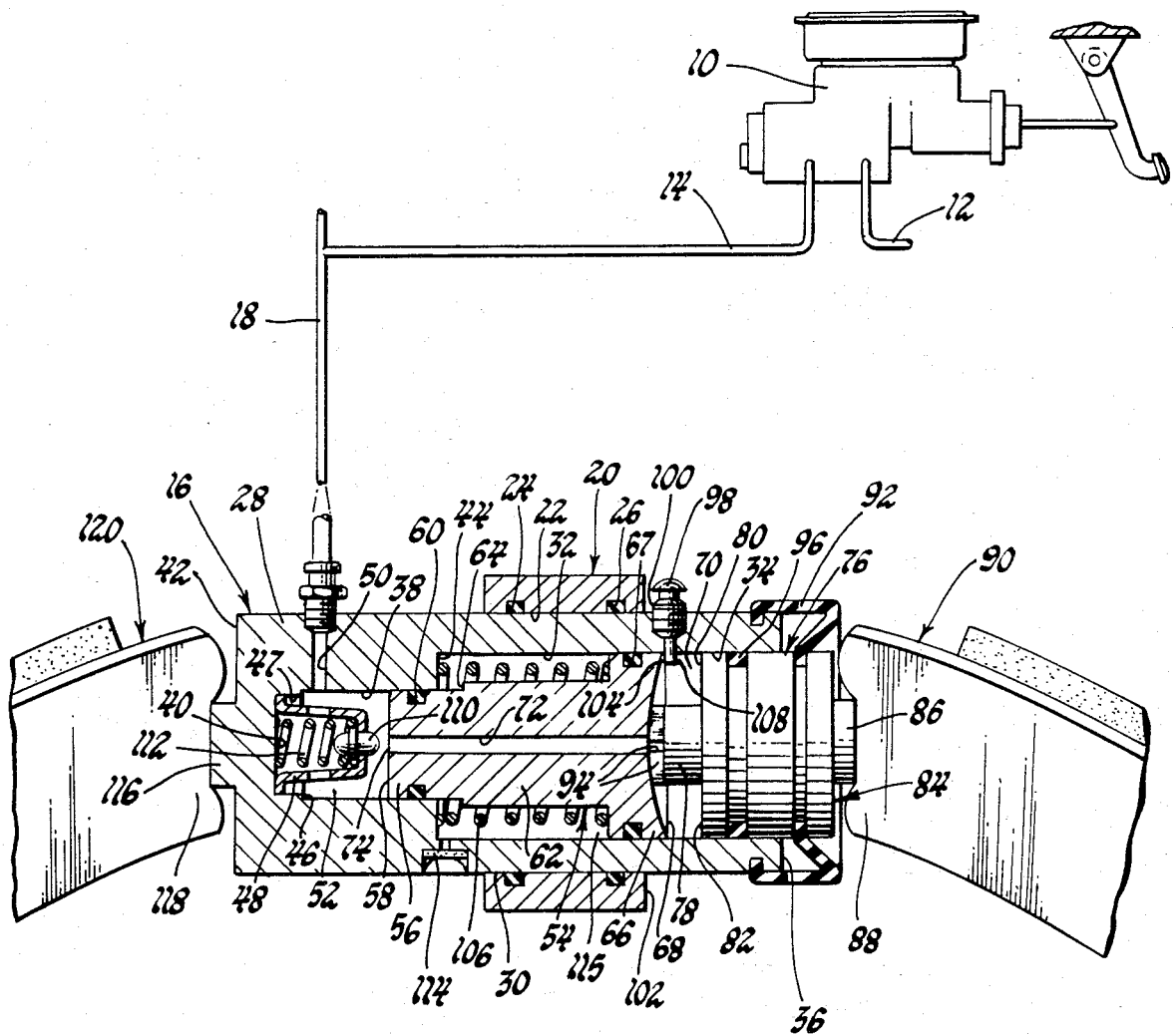

WHEEL CYLINDER ASSEMBLY WITH PROPORTIONER

The invention relates to a wheel cylinder assembly, for a brake assembly having telescoping actuating pistons with one such piston containing a pressure proportioner therein. The wheel cylinder assembly includes a fixed cylinder with a through-bore, a first wheel cylinder actuating piston formed with a closed end stepped recess and slidably extending through the fixed cylinder, and a second wheel cylinder actuating piston reciprocably received in the larger bore portion of the first wheel cylinder piston, the opposite ends of the two pistons extending outwardly and providing abutments for engaging and transmitting forces to the brake shoes of the brake assembly. A proportioner is provided within the first wheel cylinder piston. The proportioner includes a stepped proportioning piston with a bore therethrough, a spring-biased valve seat mounted in the smaller bore end of the first wheel cylinder piston bore, and a proportioning spring urging the proportioning piston in a direction away from the valve seat. The valve seat is aligned with one end of the proportioning piston bore so as to be seated thereon to close the bore when the proportioning action is to begin. The first wheel cylinder piston has stop means in its bore which limits axial movement of the proportioning piston in either axial direction. Brake actuating pressure, from a source such as a master cylinder, is introduced into an inlet connecting with the smaller bore end of the first wheel cylinder piston bore so that it flows past the valve seat, through the bore of the proportioning piston and into a second pressure chamber defined by the larger end of the proportioning piston and the second wheel cylinder piston. The brake actuating pressure acts on the first and second wheel cylinder pistons to move them against their respectively abutting brake shoes, moving the shoes into braking engagement with the brake drum. The pressure in the second pressure chamber also acts against the larger effective area of the proportioning piston and, at a predetermined pressure, moves that piston against the force of its spring so that the valve seat is engaged and the proportioning piston bore is closed. Thereafter, the piston proportions pressure from the inlet pressure chamber to the second pressure chamber and generates proportional forces on the brake shoes actuated by the wheel cylinder assembly. A stop is also provided on the first wheel cylinder piston which limits movement of that piston in the fixed cylinder bore in one direction, after which additionally generated force, due to increased brake actuating pressure in the second pressure chamber, acts on the second piston and will continue to be proportioned in accordance with the pressure proportioned into the second pressure chamber.

Prior wheel cylinders with proportioners have typically had a proportioning mechanism which proportioned brake pressure fluid to opposed pistons constructed in the usual manner of wheel cylinders so that the proportioned pressure urged those pistons in opposite directions within the wheel cylinder housing. For example, the disclosure in allowed patent application Ser. No. 319,685, entitled, "Pressure Modified Brake Actuating Pressure Proportioner", filed Nov. 9, 1981 and assigned to the common assignee, has a proportioning mechanism with the output thereof connected to a chamber defined by opposed pistons in the fixed wheel cylinder housing. Both pistons move to engage the brake shoes and neither piston has a stop which will provide a ground for that piston while the other piston continues to be in condition for movement as the pressure increases. In U.S. Pat. No. 4,266,640, issued May 12, 1981 and entitled "Wheel Cylinder", the proportioning mechanism is outside the wheel cylinder bore and proportions fluid to separate pressurizing chambers, each of which is exposed to only one of the wheel cylinder pistons. The pistons move in opposite directions in the fixed wheel cylinder housing, but have no stops limiting their brakeapplying stroke so that the other pistons may be continued to operate under the influence of the proportioned brake actuating pressure. U.S. Pat. No. 4,286,504, issued Sept. 1, 1981 and entitled, "Drum Brake Actuating Device" has a proportioning mechanism within the fixed wheel cylinder housing and located between the oppositely movable wheel cylinder pistons. Stops are provided only operable to prevent rectractile movement of the wheel cylinder pistons beyond desired predetermined points. The pressure chamber for one of the pistons is directly connected to the master cylinder, and the pressure chamber for the other piston receives the proportioned brake actuating pressure.

IN THE DRAWING

The single figure is a schematic representation of portions of a vehicle brake system with the wheel cylinder assembly embodying the invention being illustrated in section.

The brake system illustrated includes a master cylinder assembly 10 which, when actuated, produces brake actuating pressures in brake circuits attached thereto and connected to various wheel brakes on a vehicle. One brake circuit 12 is schematically illustrated as being provided for other brake units, not further shown in the drawing. The other brake circuit 14 is illustrated as being connected to supply brake actuating fluid pressure to the brake assembly containing wheel cylinder assembly 16, with the circuit also being connected to one or more other suitable brake assemblies of the vehicle. Brake circuit 14 includes a conduit 18 connected to wheel cylinder assembly 16. The wheel cylinder assembly 16 includes a fixed cylinder 20, which may be attached to a suitable fixed portion of the vehicle such as a support bracket, steering knuckle, or a backing plate. It may be suitably attached in a drum brake assembly in a manner well known in the art for wheel cylinder assemblies. Fixed cylinder 20 has a bore 22 extending therethrough and is provided with seals 24 and 26 at adjacent opposite ends of bore 22. The wheel cylinder assembly 16 also includes a first wheel cylinder piston 28 reciprocably mounted in the bore 22 of fixed cylinder 20 so as to extend through and beyond the ends of bore 22. The outer surface 30 of piston 28 is cylindrically formed and is sufficiently smooth to permit reciprocable sliding movement of piston 28 in bore 22 so that seals 24 and 26 slidably engage surface 30 and prevent contamination of the interior of bore 22.

Piston 28 has a stepped recessed bore 32 formed therein. The larger bore end 34 opens axially through the piston end 36. The smaller bore end 38 of bore 32 terminates at an end wall 40 formed by the closed piston end 42. A shoulder 44 divides the bore 32 into the larger bore end 34 and the smaller bore end 38. A smaller shoulder 46 is formed in the smaller bore end 38 axially adjacent end wall 40 but slightly spaced therefrom. The slightly smaller diameter section 47 of smaller bore end 38 between end wall 40 and shoulder 46 provides for the press-fit retention of a generally "hat-shaped" flanged valve seat retainer 48. By having the major portion of the smaller bore end portion 38 being of slightly larger diameter than the valve seat retainer retention portion 47, the retainer 48 may be inserted through bore 32 without marring any of the bore surface. It has a press fit in the bore end portion 47 between shoulder 46 and end wall 40. It is prefered that the valve seat retainer 48 have its flanged end engaging end wall 40. Piston 28 is provided with an inlet passage 50 which has its outer end connected to conduit 18 and its inner end opening into the smaller bore end 38 adjacent shoulder 46 and on the side thereof toward shoulder 44. The portion of smaller bore end 38 into which inlet passage 50 opens forms an inlet pressure chamber 52.

A stepped proportioning piston 54 has a smaller end 56 slidably received in the smaller bore end 38 so that the end wall of the piston 54 forms a movable wall 58 defining a part of inlet pressure chamber 52. A seal 60 is positioned in a groove in the proportioning piston smaller end 56 to seal the piston relative to the surface of bore end 38. The intermediate portion 62 of piston 54 is divided from the piston smaller end 56 by a shoulder 64 which is in axial engagable relation with shoulder 44 of piston 28 so as to prevent movement of piston 54 leftwardly, as seen in the drawing, beyond a point at which shoulder 64 engages shoulder 44. The piston intermediate portion 62 is somewhat larger in diameter than the piston smaller end 56 and is located in the larger bore end 34 of bore 32. The other end of piston 54 is formed by a piston larger end 66. It has a seal 67 received in a groove formed in the piston end 66 so that the piston 54 is in slidable but sealing engagement with the surface of the larger bore end 34. The end wall formed by piston larger end 66 forms a movable wall 68 which defines one side of a second pressure chamber 70. Piston 54 has an axially extending bore 72 formed therethrough, with one end opening through the movable wall 58 and forming an annular valve member 74. The other bore end opens through movable wall 68 into chamber 70.

A second wheel cylinder piston 76 is reciprocably received in the larger bore end 34 of bore 32. Piston 76 has an inner end 78 of considerably smaller diameter than the diameter of larger bore end 34, a shoulder 80 which cooperates with inner end 78 to form a movable wall 82 defining the other side of second pressure chamber 70, and a piston outer end 84. Piston outer end 84 has a portion thereof slidingly and sealingly fitting within the larger bore end 34 and a portion thereof extending outwardly of bore 32, terminating in an abutment 86 which engages the end 88 of the brake shoe assembly 90. The part of piston outer end 84 which remains outside of the bore 32 at all times is arranged to receive a flexible seal or dust cap 92, the cap 92 also being received on the first piston end 36 to prevent contamination of bore 32 through bore end 34. The second piston inner end 78 is normally in abutting axial engagement with the movable wall 68 of proportioning piston 54. Piston inner end 78 is provided with one or more cross-slots 94 which provide continuous fluid communication between bore 72 and second pressure chamber 70, even though the piston inner end 78 is in engagement with the proportioning piston movable wall 68. A seal 96 is received in a groove formed in the portion of second piston outer end 84 contained within the larger bore end 34 to provide a slidable sealing relationship between the second piston 76 and the surface of bore 32 at all times.

A stop member 98, formed by a bleeder screw, is provided on the first wheel cylinder piston 28 so that its outer end acts as a stop 100 engageable with the end 102 of fixed cylinder 20 to limit the leftward movement of piston 28 within fixed cylinder 20, as seen in the drawing. The space between stop 100 and cylinder end 102, with the assembly in the retracted position must be sufficient to allow full operational movement of piston 28 to cause braking action to take place under any condition wherein the associated brake shoe assembly is usable. The inner end of stop member 98 extends into second pressure chamber 70 so that one side acts as a stop 104 engageable by the movable wall 68 formed by the proportioning piston larger end 66. The proportioning spring 106, which acts against shoulder 44 of bore 32 and against the piston larger end 66, continually urges proportioning piston 54 toward engagement with stop 104. The other side of the stop member 98 extending within second pressure chamber 70 provides a stop 108 which is engageable by shoulder 80 to limit leftward movement, as seen in the drawing, of the second wheel cylinder piston 76.

A valve seat 110 is held in position by the valve seat retainer 48 so that it is in axial alignment with and engageable with the valve member 74 formed by one end of the bore 72 of piston 54. A valve seat spring 112 is contained within valve seat retainer 48, acts on the valve seat 110, and reacts against the bore end wall 40. Spring 112 continually urges the valve seat 110 toward the valve member 74. It can be seen that sufficient leftward movement of the proportioning piston 54 will cause the valve member 74 to engage the valve seat 110 and any additional leftward movement of piston 54 will cause compression of the valve seat spring 112. The abutting engagement of shoulders 44 and 64 will limit the extent of leftward movement piston 54 and valve seat 110.

The first wheel cylinder piston 28 has a filtered air vent 114 therein to vent the chamber 115 containing proportioning spring 106 to atmosphere so that there is no pressure generated in that chamber as the proportioning piston 54 moves within bore 32. Seals 60 and 67 effectively prevent brake fluid leakage into chamber 115 and out of vent 114. The bleeder screw and stop member 98 can be used to bleed chamber 115, as is well known in the art.

The end 42 of the first wheel cylinder piston 28 has an abutment 116 formed thereon which is in engagement with the end 118 of the brake shoe assembly 120. Brake shoe assemblies 90 and 120 are incorporated in a drum brake assembly of a suitable well known type, and portions of that assembly such as the brake drum, retracting springs, hold-down springs, adjusting mechanism, etc., are not illustrated. Those portions are well known in the brake art and form no part of this invention.

When brake actuating pressure is introduced through inlet 50 into the inlet pressure chamber 52, it initially flows through the proportioning piston bore 72 into the second pressure chamber 70 and acts on the first and second wheel cylinder pistons 28 and 76 to move them against their respectively abutting brake shoes 120 and 90. The forces generated by this pressure are in substantially equally and opposite directions on pistons 28 and 76 since the pressure acting in inlet pressure chamber 52 acts on a part of piston 28 and the pressure acting in chamber 70 acts on a part of proportioning piston 54 to transmit generated force through spring 106 to the first wheel cylinder piston 28, urging that piston leftwardly. The same effective area is found on second piston 76 exposed to pressure in chamber 70 and generates the same amount of force acting on the second piston 76. At a predetermined pressure in chamber 70, the proportioning piston 54 has been moved leftwardly against the force of spring 106 until valve member 74 engages the valve seat 110, closing the proportioning piston bore 72 to the second pressure chamber 70. Thereafter, proportioned pressure is generated in pressure chamber 70, and proportioned forces act on the brake shoes 120 and 90. The stop member 98 on the first wheel cylinder piston 28 limits the actuating movement of that piston in the bore 22 of the fixed cylinder 20 in the leftward direction, as seen in the drawing. After the stop member 98 is engaged against the end 102 of fixed cylinder 20 the additional force generated on the second wheel cylinder piston 76 by increasing pressure in chamber 70 will continue to be proportioned in accordance with pressure proportioned into the second pressure chamber.

The embodiments of the invention in which an exclusive property or privilege is claimed are defined as follows:

1. A wheel cylinder assembly adapted to act on an oppositely disposed pair of brake shoes, said wheel cylinder assembly having a brake actuating pressure proportioner therein actuatable to proportionately increase brake actuating pressures in said wheel cylinder assembly and thereby being adapted to act to decrease the forces exerted by the wheel cylinder assembly on the oppositely disposed pair of brake shoes in relation to the forces that would be so exerted should no proportioning action occur, said wheel cylinder assembly comprising:

a fixed cylinder having a bore therethrough, a first wheel cylinder piston having a stepped recessed bore therein open at the larger bore end and closed at the smaller bore end to provide an abutment adapted for engagement with one brake shoe, said first piston being sealingly and slidably mounted in said fixed cylinder bore with both ends thereof extending outwardly of said fixed cylinder bore, said smaller bore end defining an inlet pressure chamber having a brake actuating pressure inlet;

a valve seat retainer secured within said smaller bore end and having a valve seat mounted therein for limited axial movement and a spring biasing said valve seat axially toward said larger bore end;

a second wheel cylinder piston reciprocably and sealingly received in said first piston larger bore end and extending outwardly thereof and having its outer end providing an abutment adapted for engagement with another brake shoe;

a proportioning piston having a smaller end and a larger end respectively reciprocably and sealingly received in said first piston smaller bore end and larger bore end, said proportioning piston having a bore formed axially therethrough and its smaller end defining a movable wall of said inlet pressure chamber and its larger end cooperating with said second piston to define axially spaced movable walls of a second pressure chamber in continuous fluid communication with said proportioning piston bore, the end of said proportioning piston bore adjacent said valve seat being engageable therewith upon sufficient movement of said proportioning piston axially toward said valve seat, and spring means continually urging said proportioning piston axially away from said valve seat;

and stop means in said first piston bore limiting axial movement of said proportioning piston in either axial direction;

brake actuating pressure introduced through said inlet into said inlet pressure chamber initially flowing through said proportioning piston bore into said second pressure chamber and acting on said first and second wheel cylinder pistons, said first and second wheel cylinder pistons being adapted to move against respectively abutting brake shoes, the pressure in said second pressure chamber also acting on the larger effective area of said proportioning piston larger end and at a predetermined pressure moving said proportioning piston against the force of said spring means to engage said valve seat and momentarily close said proportioner piston bore and thereafter move relative to said valve seat to proportion pressure from said inlet pressure chamber to said second pressure chamber and generate proportional forces adapted to be applied on the brake shoes adapted to be actuated thereby.

2. A wheel cylinder assembly adapted to act on an oppositely disposed pair of brake shoes, said wheel cylinder assembly having a brake pressure actuating proportioner therein actuatable to proportionately increase brake actuating pressures in said wheel cylinder assembly and thereby being adapted to act to decrease the forces exerted by the wheel cylinder assembly on the oppositely disposed pair of brake shoes, in relation to the forces that would be so exerted should no proportioning action occur, said wheel cylinder assembly comprising:

a fixed cylinder having a bore therethrough, a first wheel cylinder piston having a stepped recessed bore therein open at the larger bore end and closed at the smaller bore end to provide an abutment adapted for engagement with one brake shoe, said first piston being sealingly and slidably mounted in said fixed cylinder bore with both ends thereof extending outwardly of said fixed cylinder bore, said smaller bore end defining an inlet pressure chamber having a brake actuating pressure inlet;

a valve seat retainer secured within said smaller bore end and having a valve seat mounted therein for limited axial movement and a spring biasing said valve seat axially toward said larger bore end;

a second wheel cylinder piston reciprocably and sealingly received in said first piston larger bore end and extending outwardly thereof and having its outer end providing an abutment adapted for engagement with another brake shoe;

a proportioning piston having a smaller end and a larger end respectively reciprocably and sealingly received in said first piston smaller bore end and larger bore end, said proportioning piston having a bore formed axially therethrough and its smaller end defining a movable wall of said inlet pressure chamber and its larger end cooperating with said second piston to define axially spaced movable walls of a second pressure chamber in continuous fluid communication with said proportioning piston bore, the end of said proportioning piston bore adjacent said valve seat being engageable therewith upon sufficient movement of said proportioning piston axially toward said valve seat, and spring means continually urging said proportioning piston axially away from said valve seat;

first stop means in said first piston bore limiting axial movement of said proportioning piston in either axial direction;

brake actuating pressure introduced through said inlet into said inlet pressure chamber initially flowing through said proportioning piston bore into said second pressure chamber and acting on said first and second wheel cylinder pistons, said first and second wheel cylinder pistons being adapted to move against respectively abutting brake shoes, the pressure in said second pressure chamber also acting on the larger effective area of said proportioning piston larger end and at a predetermined pressure moving said proportioning piston against the force of said spring means to engage said valve seat and momentarily close said proportioner piston bore and thereafter move relative to said valve seat to proportion pressure from said inlet pressure chamber to said second pressure chamber and generate proportional forces adapted to be applied to the brake shoes adapted to be actuated thereby;

and second stop means on said first wheel cylinder piston limiting that piston actuating movement in said fixed cylinder bore so that after said last named stop means so limits said first piston movement the additionally generated force on said second piston will continue to be proportioned in accordance with pressure proportioned into said second pressure chamber.

3. The wheel cylinder assembly of claim 2, said first and second stop means including a bleeder screw extending through a part of said first wheel cylinder piston and engageable with said proportioning piston to limit axial movement thereof in a first axial direction and engageable with said fixed cylinder to limit axial movement of said first wheel cylinder piston in an axial direction opposite the first axial direction.

* * * * *